(No Model.) 2 Sheets—Sheet 1.
T. HEPPELL & J. G. & W. PATTERSON.
MACHINERY FOR CUTTING COAL, STONE, OR OTHER HARD SUBSTANCES.
No. 529,790. Patented Nov. 27, 1894.
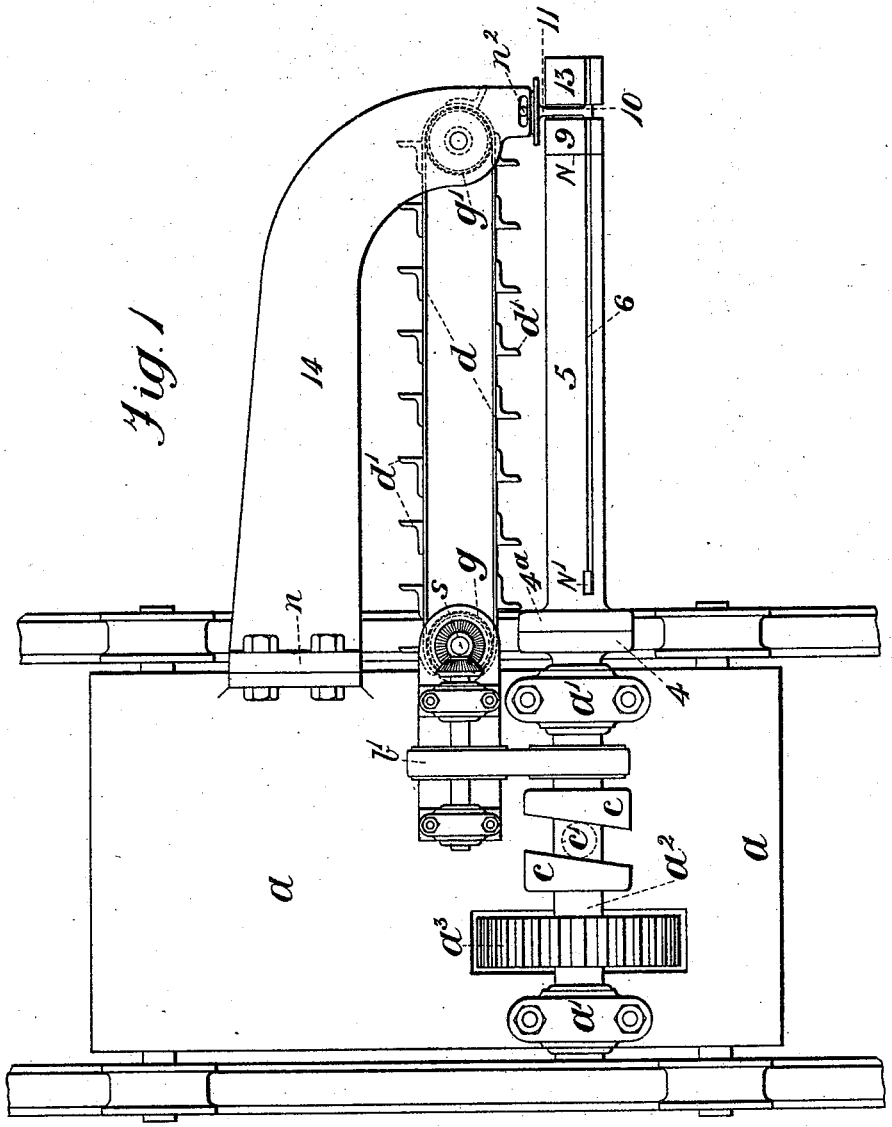

(No Model.) 2 Sheets—Sheet 2.
T. HEPPELL & J. G. & W. PATTERSON.
MACHINERY FOR CUTTING COAL, STONE, OR OTHER HARD SUBSTANCE
No. 529,790. Patented Nov. 27, 1894.
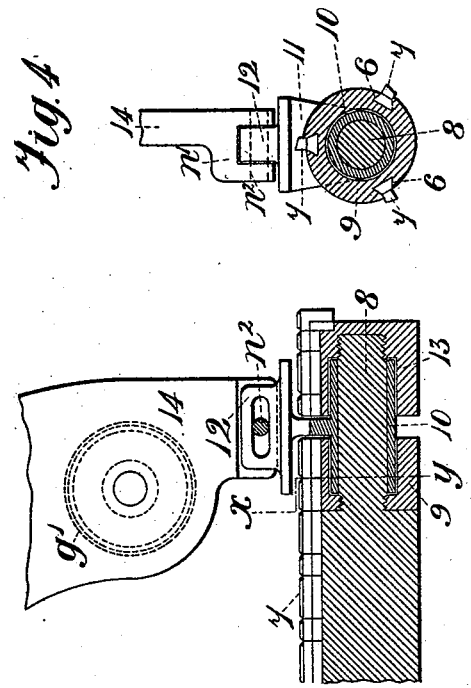
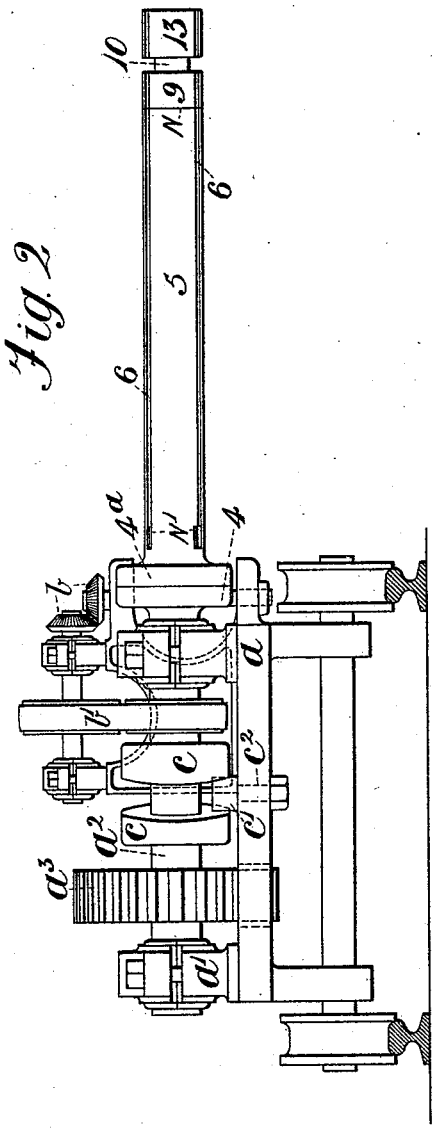
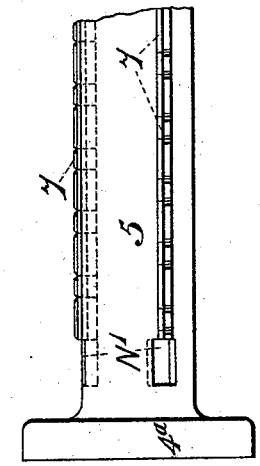
Witnesses
Inventors

UNITED STATES PATENT OFFICE.

THOMAS HEPPELL, OF BIRTLEY, AND JOHN GEORGE PATTERSON AND WILLIAM PATTERSON, OF TYNEMOUTH, ENGLAND.

MACHINERY FOR CUTTING COAL, STONE, OR OTHER HARD SUBSTANCES.

SPECIFICATION forming part of Letters Patent No. 529,790, dated November 27, 1894.

Application filed July 20, 1892. Serial No. 440,609. (No model.) Patented in England July 31, 1891, No. 12,997.

*To all whom it may concern:*

Be it known that we, THOMAS HEPPELL, residing at Leafield House, Birtley, in the county of Durham, and JOHN GEORGE PATTERSON and WILLIAM PATTERSON, both residing at 9 Front Street, Tynemouth, in the county of Northumberland, England, have invented new and useful Improvements in Machinery for Cutting Coal, Stone, or other Hard Substances, (for which we have applied for a patent in Great Britain, No. 12,997, date of application being July 31, 1891,) of which the following is a specification.

This invention relates to improvements in machinery for cutting coal, stone and similar substances.

We will fully describe our invention with reference to the accompanying drawings, in which—

Figure 1 shows a general plan view and Fig. 2 an end view. Fig. 3 shows an enlarged elevation of the cutter bar and its connection (in section) to the backstay. Fig. 4 is a section on line $x\,y$ in Fig. 3.

Referring to the drawings $a$ is a tram mounted on wheels and adapted to run on rails and on this tram we mount the coal cutting machinery in which $a'$ are main brackets fixed on the tram supporting main shaft $a^2$ designed to be driven from any suitable source of power, e. g., through spur wheel $a^3$. The shaft $a^2$ ends with a flange 4 to which is coupled flange $4^a$ of cutter bar 5. This bar is provided with dovetail slots 6 to take cutters 7. (See Figs. 3 and 4.) The end of bar 5 is reduced as shown at 8 and on this reduced part are mounted as shown a recessed sleeve 9, a collar 10 with an arm 11 terminating in a slotted headpiece 12 and a recessed sleeve 13 which is screwed like a boxnut onto the end of bar 5. The sleeves 9 and 13 are also provided with cutters as described with reference to bar 5.

To support the end of the cutter bar we provide a backstay 14 bolted to the tram at $n$. The outer end of this backstay is forked as shown at $n'$ and in this fork the slotted headpiece 12 of arm 11 on collar 10 is designed to work. A pin $n^2$ passing through the slot secures the collar in position on the backstay and thus the collar 10 forms a bearing for the outer end of the cutter bar. The latter with its cutters receives its rotary motion from main driving shaft $a^2$ the part 8 freely revolving in collar bearing 10. There is thus a space between sleeves 9 and 13 unprovided with cutters and to provide against this deficiency we give the cutter bar a short reciprocating motion by means of the inclined cams $c$ on rotary shaft $a^2$ working in contact with roller $c'$ fitted on spindle $c^2$. The slot in headpiece 12 of collar 10 thus reciprocates on pin $n^2$ to an extent sufficient to allow the revolving and reciprocating cutters on sleeves 9 and 13 to remove the coal or stone between them.

To remove the débris caused by the cutters we provide an endless band or chain $d$ fitted with scrapers $d'$. The band traverses pulleys $g$ and $g'$ the former mounted on spindle $s$ and the latter on the backstay 14. Bevel gearing $b$ driven from main shaft by belting $b'$ serves to actuate the scraper band. The latter is designed to follow the cutters closely so as to remove the débris and prevent clogging of the cutter bar while working.

In practice the machine will be found very useful in undercutting coal seams where the tram will be arranged parallel to the face of coal so that the cutter bar can undercut a long face of coal without interruption.

The cutters may be inserted in the slots in the cutter bar at N and slid along toward N', where the slot is enlarged to enable the cutters to be taken out and at this point also stopper pieces are used to secure the cutters endwise in position the sleeve 9 securing them at the opposite end.

The cutters are so arranged in the several slots of the cutter bar that any interval between any two consecutive cutters shall be traversed by a cutter in a succeeding slot.

The whole machine may receive its forward feed motion by ordinary bevel or equivalent gearing connecting the driving shaft with the tram axle and if desired the whole machine may be pivoted on the tramplate so that it can be moved radially to facilitate the applicability of the machine in awkward situations.

What we claim as our invention, and desire to secure by Letters Patent, is—

1. In machines for cutting coal stone and similar hard substances the combination with a rotary and reciprocatory cutter bar 5 having a reduced portion 8 thereon of the sleeves 9 and 13 and collar 10 with arm 11 and slotted headpiece 12 connected to a pin on the backstay 14, the several parts being arranged so as to provide a bearing to the outer end of the cutter bar while it is being rotated or rotated and reciprocated simultaneously, substantially as herein set forth.

2. In machines for cutting coal stone and similar hard substances the combination with a rotary cutter bar 5 having a reduced portion 8 thereon and shaft $a^2$ adapted to simultaneously reciprocate by the contact of the inclined cams $c$ with the roller $c'$ fitted on the spindle $c^2$ of the sleeves 9 and 13 and collar 10 with arm 11 and slotted headpiece 12 connected to a pin on the backstay 14 the several parts being arranged so as to provide a bearing to the outer end of the cutter bar while it is being rotated or rotated and reciprocated simultaneously, substantially as herein set forth.

3. In machines for cutting coal stone and similar hard substances the combination with a rotary and reciprocatory cutter bar 5 having a reduced portion 8 thereon, sleeves 9 and 13, collar 10 with arm 11 and slotted headpiece 12 connected to a pin on the backstay 14 of the scraper band $d$ with scrapers $d'$ adapted to remove the débris from the cutters of the bar 5 the several parts being arranged and adapted to operate substantially as herein set forth.

THOMAS HEPPELL.
JOHN GEORGE PATTERSON.
WILLIAM PATTERSON.

Witnesses:
JAMES LOWE,
*Accountant, Newcastle.*
JOHN ROBERT BROUGHTON,
*Engineer.*